Oct. 8, 1963 C. C. SCIUTO ETAL 3,106,379
INTERLOCKED VALVE AND COUPLING
Filed March 30, 1961

INVENTORS.
CARL C. SCIUTO and
VERNON HELLSTERN
BY
Cohn and Powell
ATTORNEY.

United States Patent Office 3,106,379
Patented Oct. 8, 1963

3,106,379
INTERLOCKED VALVE AND COUPLING
Carl C. Sciuto, St. Louis, and Vernon Hellstern, Glendale, Mo., assignors to Stile-Craft Manufacturers, Inc., St. Louis, Mo., a corporation of Missouri
Filed Mar. 30, 1961, Ser. No. 99,506
11 Claims. (Cl. 251—149.9)

This invention relates generally to improvements in a coupling, and more particularly to improvements in a hose coupling that can be quickly and easily connected or disconnected.

In the heretofore conventional type of quick-connect—disconnect coupling, the plug of the male member directly actuated a valve mechanism when inserted into the socket of the cooperating female member, whereby to permit flow of fluid under pressure through the coupling members. In this type of coupling, the valve mechanism is usually opened before the plug is latched in position. This condition requires a great deal of effort, depending upon the magnitude of the pressure involved in the system, to force the plug inwardly against such pressure until the plug is latched.

Another disadvantage present in the usage of this conventional type of coupling is caused by the fact that a latching sleeve cooperates with radially moving locking elements upon reciprocating movement of the sleeve on the female member to release the plug while the plug is subjected to fluid pressure. This pressure tends to eject the male member forcibly from the female member.

Of course, it will be readily realized that this situation could be very dangerous to the operator directly manipulating the coupling or to anyone within the immediate vicinity. For example, if the latched sleeve were accidentally jarred sufficiently to unlatch the plug, the fluid pressure could throw the male member and its connected hose a considerable distance, and thereby possibly strike and inflict serious injury to anyone in the danger zone.

It is a major objective of the present invention to eliminate the above described functional disadvantages by providing a quick-connect—disconnect coupling in which the coacting members are latched together before the valve mechanism is automatically opened, and conversely in which the valve mechanism is automatically closed before the coupling members are unlatched.

An important object is achieved by the provision of a sleeve slidably mounted on the coupling body, and of a control means operatively interconnecting the sleeve with the body for regulating reciprocative movement of the sleeve between limits and for regulating rotative movement of the sleeve in such limits, whereby selectively to actuate the latch means to lock or release the plug and also selectively to actuate the valve means to place the connected coupling members in or out of flow communication.

Another important object is realized by providing a partition across the tubular body of the female member to form a socket adapted to receive the plug of the male member, and by providing at least one valve port in the body on each side of the partition and underlying the reciprocatively mounted sleeve. The sleeve includes a recess that places the valve ports in communication when the sleeve is moved to one limit after the sleeve has effectuated latching of the plug in the socket.

Other advantages are afforded by providing a sealing member on the sleeve that engages the body between the valve ports to disrupt flow therebetween when the sleeve is moved to its other limit after which the sleeve can then effectuate unlatching of the plug.

Still another important object is achieved by providing a plurality of locking elements peripherially about the socket, the locking elements being engageable by the sleeve to cam the elements into locking engagement with the plug located in the socket incident to rotative movement of the sleeve in one limit to a position in which the sleeve is then conditioned for reciprocative movement so as to actuate the valve means. The sleeve enables the locking elements to move out of locking engagement from the plug only when the sleeve is located in a locked position which prevents reciprocative movement of the sleeve and only when the valve means is closed.

It is an important objective to provide a control means that operatively interconnects the sleeve with the coupling body to regulate reciprocative movement of the sleeve between limits and to regulate rotative movement of the sleeve in such limits, the control means selectively locking the sleeve in each limit against reciprocation upon rotative movement of the sleeve, the sleeve unlatching the latch means from the plug only when locked in one limit and the sleeve closing the valve means only when the sleeve is disposed in such one limit.

Yet another important objective is provided by constructing the control means that operatively interconnects the sleeve and coupling body so that the sleeve and body can be conveniently and quickly disconnected to remove the sleeve if necessary. The control means includes a longitudinal groove extending in a generally fore and aft direction and a transverse groove at each end of the longitudinal groove, and a pin carried by the sleeve and engaging the longitudinal groove to regulate reciprocative movement of the sleeve between limits and engaging the transverse grooves to regulate rotative movement of the sleeve in such limits, the pin engaging the transverse grooves to lock the sleeve selectively in each limit. The pin is detachably connected to the sleeve in such a manner that it can be easily removed in order to separate the sleeve from the body.

An important objective is realized in providing a quick-connect—disconnect coupling that is simple and durable in construction, economical to manufacture and assemble, efficient in operation, and which can be readily operated by anyone without any instruction.

The foregoing and numerous other objects and advantages of the invention will more clearly appear from the following detail description of a prefered embodiment, particularly when considered in connection with the accompanying drawings, in which.

Figure 1:
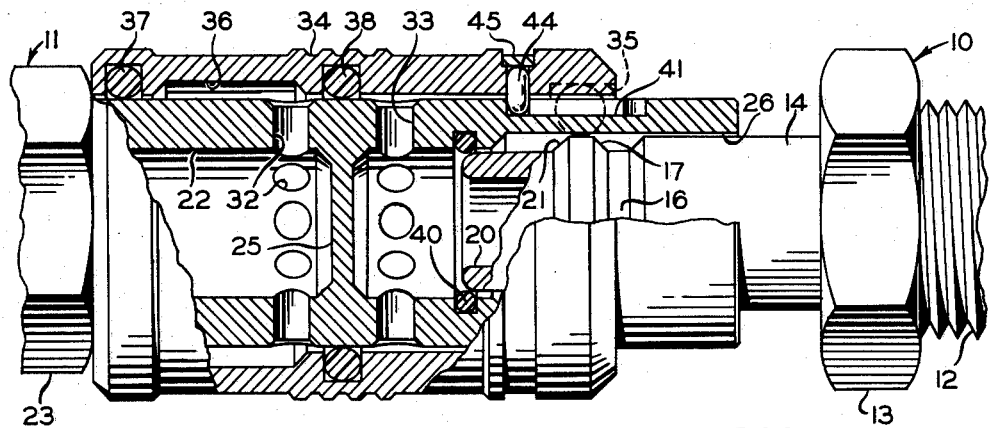
FIG. 1 is a side elevational view of the coupling, partly in cross section as seen along a vertical plane passed through the longitudinal axis, the actuating sleeve being moved to its valve-closed and plug-unlatched position.

Referring now by characters of reference to the drawing, and first to FIG. 1, it is seen that the quick-connect—disconnect coupling includes a male member generally indicated at 10 and a cooperating female member referred to at 11.

The male member 10 consists of a threaded fitting 12 adapted to be connected selectively to a hose or other similar line to a fluid system. A nut 13 formed integrally with fitting 12 facilitates attachment of the male member 10 to its associated hose. Extending forwardly from and formed integrally with nut 13 is a plug 14. The male member 10 is tubular as provided by a longitudinal passageway 15 (FIG. 2) extending through plug 14, nut 13 and fitting 12.

An annular groove 16 is provided about the periphery of plug 14. The forwardmost margin defining the groove 16 is inclined forwardly to provide a cam shoulder 17. The plug 14 is provided with a reduced end portion 20 and a rearwardly inclined cam shoulder 21.

The female member 11 includes a tubular body 22, the rearmost end of which includes an integral nut 23. The interior of this rear end of body 22 is threaded to receive a fitting 24 (FIG. 2) that is adapted to connect its associated hose with the female member 11.

Formed across the body 22 at a distance spaced inwardly from its front end, is a partition 25 that divides the internal bore. The partition 25 provides a socket 26 forwardly of the partition which is adapted to receive the plug 14.

Figure 3:
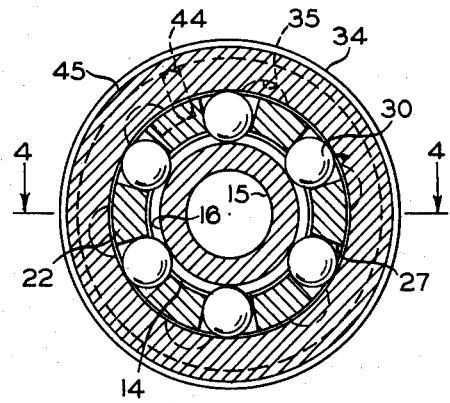
FIG. 3 is a cross sectional view as seen along line 3—3 of FIG. 2.

The latch mechanism includes a plurality of spaced apertures 27 formed peripherally about the body 22 and communicating with the socket 26. In the preferred embodiment, a total of six apertures 27 are provided which are located in sixty degree relationship as is best seen in FIG. 3. It will be noted that the apertures 27 are tapered inwardly toward the socket 26 for reasons which will later appear.

Located in each of the apertures 27 is a ball 30 constituting a locking element. The locking balls 30 are adapted to move radially into and out of the socket 26. However it will be noted that the tapered apertures 27 engage the balls 30 to prevent the balls from falling freely into the socket 26.

The valve mechanism includes a first series of regularly spaced valve ports 32 formed peripherally about the body 22 immediately to the rear of partition 25. In the preferred embodiment, a total of eight valve ports 32 are provided at forty-five degrees relation.

A corresponding series of valve ports 33 are formed in body 22 immediately in front of partition 25. These valve ports 33 are arranged just to the rear of the reduced end portion 20 of plug 14 when the plug 14 is inserted into the socket 26 so as to provide a direct communication with the passageway 15 through such plug.

The mechanism for effectively and operatively actuating the latch and valve in this coupling consists of a sleeve 34 slidably mounted on body 22. The front end of sleeve 34 is provided with a plurality of shallow recesses 35 spaced peripherally about the internal bore of such sleeve, the number of recesses 35 corresponding to the number of locking balls 30.

In one rotative position of sleeve 34 in its fully retracted limit illustrated in FIG. 1, the recesses 35 align with the balls 30 and are adapted to receive the balls 30 to permit the locking balls 30 to move outwardly of the body 22 and thereby disengage operatively from plug 14.

Figure 2:
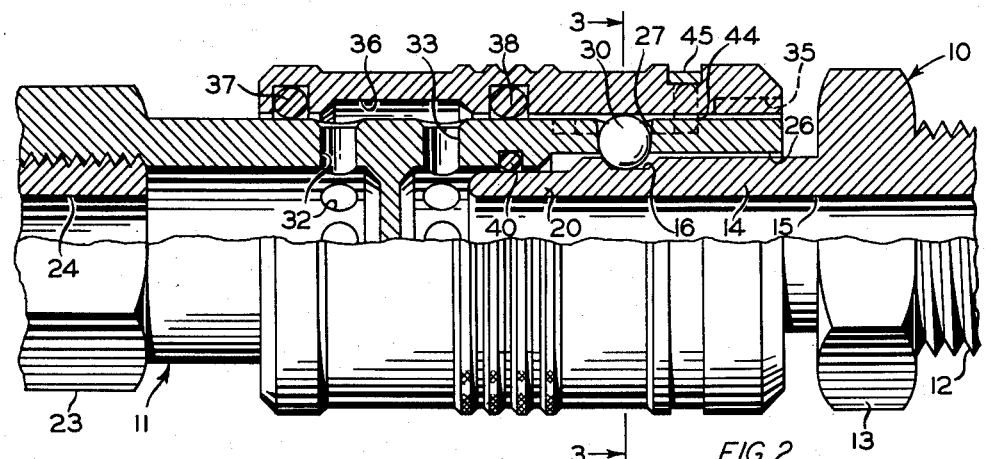
FIG. 2 is a fragmentary cross sectional view similar to FIG. 1, but illustrating the actuating sleeve in its valve-open and plug-latched position.

Formed internally at the rear of sleeve 34 is a valve recess 36 of sufficient length to bridge the valve ports 32 and 33 when the sleeve 34 is located in its fully extended limit illustrated in FIG. 2. This valve recess 36 places the valve ports 32 and 33 in direct communication. At each end of the valve recess 36, the sleeve 34 is provided with an annular groove. These grooves are adapted to receive O-rings 37 and 38 constituting sealing members. The O-rings 37 and 38 are resilient and engage the periphery of body 22 in sealing relation.

When the sleeve 34 is fully extended as shown in FIG. 2, the O-rings 37 and 38 engage the body 22 on opposite sides of the valve ports 32 and 33, thereby precluding leakage of fluid under pressure from ports 32 and 33 between the body 22 and sleeve 34, and enabling the flow of fluid under pressure to follow the path directly through valve ports 32 into valve recess 36, through valve ports 33 and thence into the socket 26.

When the sleeve 34 is fully retracted as shown in FIG. 1, the O-ring 38 engages the body region between the valve ports 32 and 33 to disrupt flow between such valve ports. Again, the pair of O-rings 37 and 38 preclude escape of leakage of fluid under pressure from valve ports 32 between the body 22 and sleeve 34.

The interior of body 22 is provided with an annular groove at its socket 26, the groove being adapted to receive and position an O-ring 40. The O-ring 40 is adapted to engage the reduced end portion 20 of plug 14 when the plug is inserted into socket 26 to provide a seal between the plug 14 and body 22.

A control means operatively interconnects the sleeve 34 and the body 22 to regulate reciprocative movement of the sleeve 34 between retracted and extended limits and to regulate rotative movement of the sleeve in such limits. Particularly, the control means includes a substantially C-shaped guide means formed in body 22 consisting of a longitudial groove 41 and transverse grooves 42 and 43 at opposite ends of the longitudinal groove 41. Carried by sleeve 34 is a pin 44 constituting a follower that is received in and engages the C-shaped guide means 41—43. A retaining band 45 is carried by the periphery of sleeve 34 and overlies the pin 44 to hold the pin 44 in assembly. The band 45 is resilient and can be easily removed to enable withdrawal of pin 44, and thereby enable sleeve 34 to be disassembled from the body 22 if desired.

It is thought that the operation and functional advantages of the coupling have become fully apparent from the foregoing detailed description of parts, but for completeness of disclosure the connection and disconnection of the coupling members will be briefly described.

It will be assumed that the coupling members 10 and 11 are detached and that the sleeve 34 is in the fully retracted limit illustrated in FIG. 1 and is rotated in this limit until the pin 44 is located in transverse groove 42. In this position, the sleeve 34 is locked against reciprocation. Moreover, in this position of sleeve 34, the front recesses 35 are aligned directly opposite the locking balls 30 so that the balls 30 can be moved outwardly into a plug-unlatched position, and the O-ring 38 is located between the valve ports 32 and 33 so that the valve means is closed.

It will be noted that flow of fluid under pressure through the female coupling member 11 is prevented by the particular location of the O-ring 38. The fluid is in communication with the valve recess 36 through valve ports 32, but cannot flow between the body 22 and sleeve 34 because of the sealing relationship of O-rings 37 and 38.

First, the plug 14 is inserted into body socket 26. As the plug 14 moves inwardly, the camming shoulder 21 engages the locking balls 30 to move the balls 30 outwardly into the front recesses 35 of sleeve 34. Because the sleeve 34 overlies the balls 30, the balls 30 are retained in the body apertures 27. Next, the O-ring 40 engages the reduced plug end 20 to provide a seal. When fully inserted, the groove 16 is aligned radially with the locking balls 30.

It will be importantly noted that during this insertion of plug 14, the valve mechanism remains closed, and consequently the plug 14 is not subjected to any fluid pressure.

After the plug 14 is fully inserted, the actuating sleeve 34 is rotated while in its fully retracted limit. Guiding the sleeve 34 upon such rotative movement, the pin 44 moves along the transverse groove 42 into the rear end of longitudinal groove 41. As the sleeve 34 is rotated to the position defined above, the sleeve recesses 35 move out of alignment with the locking balls 30 and the sleeve 34 cams the locking balls 30 inwardly into the socket 26, and into latching engagement with the plug 14. It will now be noted that the plug 14 is latched, yet the valve mechanism is still closed.

Then, the actuating sleeve 34 is moved forwardly to the other extended limit shown in FIG. 2. During this forward movement of sleeve 34, the pin 44 moves from the rear end to the front end of longitudinal groove 41. As the sleeve 34 moves forwardly, the O-ring 38 clears the body region between the valve ports 32 and 33, and in fact begins to ride over the valve ports 33 to the opposite side. In the fully extended limit of sleeve 34, the O-rings 37 and 38 engage the body 22 on opposite sides of the valve ports 32 and 33. Therefore, the valve ports 32 and 33 are placed in direct communication by the sleeve valve recess 36. Fluid is now allowed to flow under pressure from the female member line outwardly through the valve ports 32 into the passageway afforded by the sleeve valve recess 36, thence into the socket 26 through the valve ports 33, and thence through the passageway 15 formed in the male member 10.

In this extended limit of sleeve 34, the recesses 35 are still misaligned relative to the locking balls 30 so that the plug 14 remains latched.

Figure 4:
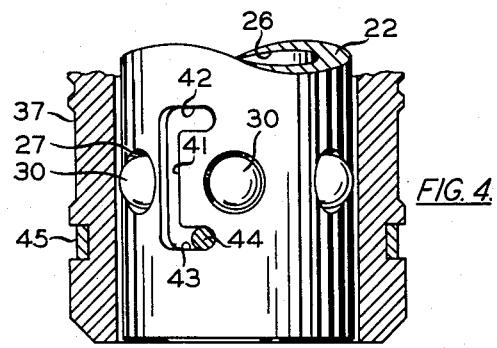
FIG. 4 is a fragmentary cross sectional view as seen along line 4—4 of FIG. 3, the coupling body being illustrated in plan.

The sleeve 34 is then rotated as permitted by the movement of pin 44 into the front transverse groove 43, as shown in FIG. 4. Again, the sleeve 34 is locked in this position against reciprocation, the valve mechanism remains open and the plug 14 remains latched.

It will be importantly noted that the sleeve 34 is locked against reciprocation in each of its limits upon rotation of the pin 44 into the respective transverse grooves 42 and 43. Also it will be realized that the valve mechanism is only closed by the sleeve 34 when the sleeve is moved longitudinally to its retracted limit and that the plug 14 can only be unlatched when the sleeve 34 is rotated to a locked position while in this retracted limit.

Disconnection of the coupling members 10 and 11 is accomplished by the mere reversal of the above described procedure. For example, the sleeve 34 is rotated to move the pin 44 along transverse groove 43 into the front end of longitudinal groove 41, whereby to unlock the sleeve 34. Then, the sleeve 34 is moved rearwardly from its fully extended limit until the O-ring 38 crosses the valve ports 33 and sealingly engages the body region between valve ports 32 and 33, whereby to stop fluid flow through the coupling. During this retraction of sleeve 34, the pin 44 moves from the front end to the rear end of longitudinal groove 41. The locking balls 30 are maintained in their latched position by engagement with the overlying sleeve 34.

After the valve mechanism is completely closed and the sleeve 34 is located in its fully retracted limit, the sleeve 34 is then rotated to move pin 44 into the rear transverse groove 42. When the sleeve 34 is rotated as described, the sleeve 34 is locked against reciprocation, and in addition, the sleeve recesses 35 are aligned with the locking balls 30 to permit withdrawal of the plug 14. As the plug 14 is moved outwardly, the cam shoulder 17 forces the locking balls 30 radially outward of the apertures 27 into the sleeve recesses 35. The locking balls 30 then ride over the periphery of the plug 14 as the plug is fully withdrawn.

Under some circumstances, there can be considerable fluid pressure existing momentarily in male member 10 when the sleeve 34 is retracted to close the valve ports 32 and 33 as determined by movement of pin 44 to the rear end of longitudinal groove 41. As stated previously, in this limit of sleeve 34, the plug 14 remains effectively latched by the locking balls 30. Any fluid pressure existing within the male member 10 is released by the escape of fluid from plug 14 through the valve ports 33 and thence to the atmosphere by way of the clearance space between the sleeve 34 and valve body 22.

This particular angular relationship of the longitudinal groove 41 and the rear transverse groove 42 provides for a definite dwell at the rear end of longitudinal groove 41 by the pin 44 before the pin 44 is moved into the rear transverse groove 42. Therefore it is seen that the structural arrangement provides for a positive dwell of the sleeve 34 between its longitudinal rearward movement and its subsequent rotative movement into locking position. This dwell of sleeve 34 provides a sufficient time lapse for the escape of fluid from the male member 10 before the plug 14 is positively unlatched from the female member 11. The removal of this fluid pressure from the male member 10 before the plug 14 is unlatched, removes any hazard that the male member 10 might be forcibly ejected from the female member 11 under pressure and thereby strike someone in the immediate vicinity.

Although the invention has been described by making detailed reference to a single preferred embodiment, such detail is to be understood in an instructive, rather than in any restrictive sense, many variants being possible within the scope of the claims hereunto appended.

We claim as our invention:

1. In a coupling, a tubular plug, a tubular body providing a socket adapted to receive said plug, latch means carried by said body and selectively engageable with said plug, valve means at least partially in said body, a sleeve slidably mounted on said body, control means operatively interconnecting said sleeve with said body to regulate reciprocative movement of the sleeve between limits and to regulate rotative movement of the sleeve in said limits, means interconnecting the sleeve with said valve means so as to open the valve means upon longitudinal movement to one limit and so as to close the valve means upon longitudinal movement to the other limit, and means interconnecting the same said sleeve with said latch means so as to unlatch the plug only when the sleeve is rotated while located in the said other limit, said control means selectively locking the sleeve against reciprocation in each limit upon rotative movement.

2. In a coupling, a tubular plug, a tubular body providing a socket adapted to receive said plug, latch means carried by said body and selectively engageable with said plug, valve means at least partially in said body, a sleeve slidably mounted on said body, means interconnecting the sleeve with said valve means, means interconnecting the same said sleeve with said latch means, and control means operatively interconnecting said sleeve with said body to regulate reciprocative movement of the sleeve between limits and to regulate rotative movement of the sleeve in said limits, said control means selectively locking the sleeve in each limit against reciprocation upon rotative movement of the sleeve, said sleeve including means for unlatching the latch means from the plug only when locked in one limit, and the same said sleeve closing the valve means only when disposed in said one limit.

3. In a coupling, a tubular plug, a tubular body providing a socket adapted to receive said plug, latch means carried by said body member and selectively engageable with said plug, valve means at least partially in said body member, a sleeve member slidably mounted on said body member, means interconnecting the sleeve member with said valve means, means interconnecting the same said sleeve member with said latch means, a guide means on one of said members, and a cooperating follower carried by the other of said members, said follower engaging said guide means to regulate reciprocative movement of the sleeve member between limits and to regulate rotative movement of the sleeve member in said limits, said follower engaging said guide means to lock the sleeve member selectively in each limit against reciprocation upon rotative movement of the sleeve member in each limit, said sleeve member including means for unlatching the latch means from the plug only when the sleeve member is locked in one limit, and the same said sleeve member closing the valve means only when the sleeve member is disposed in said one limit.

4. In a coupling, a tubular plug, a tubular body member providing a socket adapted to receive said plug, latch means carried by said body member and selectively engageable with said plug, valve means at least partially in said body member, a sleeve member slidably mounted on said body member, means interconnecting the sleeve member with said valve means, means interconnecting the same said sleeve member with said latch means, a guide means on one of said members including a longitudinal guide portion and a transverse guide portion at each end of said longitudinal guide portion, and a cooperating follower carried by the other of said members, said follower engaging the said longitudinal guide portion to regulate reciprocative movement of the sleeve member between limits and engaging said transverse guide portions to regulate rotative movement of the sleeve member in said limits, said follower engaging said transverse guide portions to lock the sleeve member against reciprocation in each limit, said sleeve member including means for unlatching the latch means from the plug only when the sleeve member is locked in one limit, and the same said sleeve member closing the valve means only when the sleeve member is disposed in said one limit.

5. In a coupling, a tubular plug, a tubular body member providing a socket adapted to receive said plug, latch means carried by said body member and selectively engageable with said plug, valve means at least partially in said body member, a sleeve member slidably mounted on said body member, means interconnecting the sleeve member with said valve means, means interconnecting the same said sleeve member with said latch means, a guide means on one of said members including a longitudinal groove and a transverse groove at each end of said longitudinal groove, and a cooperating follower carried by the other of said members, said follower engaging the said longitudinal groove to regulate reciprocative movement of the sleeve member between limits and engaging said transverse grooves to regulate rotative movement of the sleeve member in said limits said follower engaging said transverse grooves to lock the sleeve member selectively against reciprocation in each limit, said sleeve member including means for unlatching the latch means from the plug only when the sleeve member is locked in one limit, and the same said sleeve member closing the valve means only when the sleeve member is disposed in said one limit.

6. In a coupling, a tubular plug, a tubular body providing a socket adapted to receive said plug, a plurality of locking elements carried loosely by the body peripherally about said socket, said locking elements being selectively movable into said socket and into latching engagement with said plug, valve means at least partially in said body, a sleeve slidably mounted on said body and surrounding said locking elements in operative relation therewith, means interconnecting the sleeve with said valve means, a control means operatively interconnecting said sleeve with said body to regulate reciprocative movement of the sleeve between limits and to regulate rotative movement of the sleeve in said limits, said control means selectively locking the sleeve against reciprocation in each limit upon rotative movement of the sleeve, said sleeve being provided with recesses alignable with and adapted to receive the locking elements only when the sleeve is locked in one limit so as to unlatch the plug, and the same said sleeve closing the valve means only when the sleeve is disposed in said one limit.

7. In a coupling, a tubular plug, a tubular body member providing a socket adapted to receive said plug, a plurality of locking elements carried loosely by the body member peripherally about said socket, said locking elements being selectively movable into said socket and into latching engagement with said plug, valve means at least partially in said body member, a sleeve member slidably mounted on said body member and surrounding said locking elements in operative relation therewith, means interconnecting the sleeve member with said valve means, a guide means on one of said members including a longitudinal groove and a transverse groove at each end of said longitudinal groove, a cooperating follower carried by the other of said members, said sleeve member being movable to a first position in which said follower engages one of said transverse grooves to lock said sleeve member against reciprocation, said sleeve member including recesses aligned with and adapted to receive said locking elements when the sleeve member is in said locked first position so as to unlatch the plug, and said sleeve member closing said valve member; said sleeve member being movable to a second position in which said follower is moved to said longitudinal groove at one limit upon rotation of said sleeve member to condition the sleeve member for subsequent longitudinal movement and to misalign said recesses with said locking elements so that the sleeve member urges the locking element into latching engagement with the plug, and said sleeve member maintaining said valve means closed; said sleeve member being longitudinally movable to a third position in which said follower is moved along the longitudinal groove to the other limit so as to open said valve means and maintain the plug latched; and said sleeve member being movable to a fourth position upon rotation of the sleeve member in said other limit in which the follower moves along the other said transverse groove so as to lock said sleeve member against reciprocation, to maintain the valve means open and to maintain the plug latched.

8. In a coupling, a tubular plug, a tubular body including a partition providing a socket adapted to receive said plug, latch means carried by said body and selectively engageable with said plug, said body being provided with valve ports at each side of said partition, a sleeve slidably mounted on said body and surrounding said latch means in operative relation therewith, control means operatively interconnecting said sleeve with said body to regulate reciprocative movement of the sleeve between limits and to regulate rotative movement of the sleeve in said limits, said control means selectively locking the sleeve in each limit against reciprocation upon rotative movement of said sleeve, said sleeve including means unlatching the latch means from the plug only when the sleeve is locked in one limit, and means carried by the same said sleeve placing said valve ports selectively in communication when the sleeve is moved from said one limit to the other limit.

9. In a coupling, a tubular plug, a tubular body member including a partition providing a socket adapted to receive said plug, latch means carried by said body member and selectively engageable with said plug, said body member being provided with valve ports at each side of said partition, a sleeve member slidably mounted on said body member and surrounding said latch means in operative relation therewith, a guide means on one of said members including a longitudinal groove and an angularly related transverse groove at each end of said longitudinal groove, a cooperating follower carried by the other of said members; said sleeve member being movable to a first position in one limit in which said follower engages one of said transverse grooves to lock said sleeve member against reciprocation, said sleeve member including means selectively unlatching the plug when in said locked first position, and means carried by said sleeve member closing said valve ports in said locked first position; said sleeve member being movable to a second position in which said follower is moved to said longitudinal groove in said one limit upon rotation of said sleeve member to condition the sleeve member for subsequent longitudinal movement and to unlatch said plug, said sleeve member maintaining said valve ports closed; said sleeve member being longitudinally movable to a third position in which said follower is moved along the longitudinal groove to the other limit so as to place said valve ports selectively in communication, the sleeve member maintaining the plug latched; and said sleeve member being movable to a fourth position upon rotation of the sleeve member in said other limit in which the follower moves along the other said transverse groove so as to lock said sleeve member against reciprocation, to maintain the valve port open and to maintain the plug latched.

10. In a coupling, a tubular plug, a tubular body including a partition providing a socket adapted to receive said plug, a plurality of locking elements carried loosely by the body peripherally about said socket, said locking elements being selectively movable into said socket and in to latching engagement with said plug, said body being provided with valve ports at each side of said partition, a sleeve slidably mounted on said body and surrounding said locking elements in operative relation, control means operatively interconnecting said sleeve with said body to regulate reciprocative movement of the sleeve between limits and to regulate rotative movement of the sleeve in said limits, said control means selectively locking the sleeve in each limit against reciprocation upon rotative movement of said sleeve, said sleeve being provided with recesses alignable with the locking elements only when the sleeve is locked in one limit so as to unlatch the plug, and means carried by the same said sleeve placing said valve ports selectively in communication only when the sleeve is moved from said one limit to the other limit.

11. In a coupling, a tubular plug, a tubular body member including a partition providing a socket adapted to receive said plug, a plurality of locking elements carried loosely by the body member peripherally about said socket, said locking elements being selectively movable into said socket and into latching engagement with said plug, the body member being provided with valve ports at each side of said partition, a sleeve member slidably mounted on said body member and surrounding said locking elements in operative relation therewith, a guide means on one of said members including a longitudinal groove and an angularly related transverse groove at each end of said longitudinal groove, a cooperating follower carried by the other of said members; said sleeve member being movable to a first position in one limit in which said follower engages one of said transverse grooves to lock said sleeve member against reciprocation, said sleeve member including recesses aligned with and adapted to receive said locking elements when the sleeve member is locked in said one limit so as to unlatch the plug, and means carried by said sleeve member selectively closing said valve ports when the sleeve member is locked in said one limit; said sleeve member being movable to a second position in which said follower is moved to said longitudinal groove at said one limit upon rotation of said sleeve member to condition the sleeve member for subsequent longitudinal movement and to misalign said recesses with said locking elements so that the sleeve member cams the locking elements into latching connection with the plug, and said sleeve member maintaining said valve ports closed; said sleeve member being longitudinally movable to a third position in which said follower is moved along the longitudinal groove to the other limit so as to selectively place said valve ports in communication, the sleeve maintaining the plug latched; and said sleeve member being movable to a fourth position upon rotation of the sleeve member in said other limit in which the follower moves along the other said transverse groove so as to lock said sleeve member against reciprocation, to maintain the valve ports open and to maintain the plug latched.

References Cited in the file of this patent

UNITED STATES PATENTS 1,850,879   Hunt _____ Mar. 22, 1932

FOREIGN PATENTS 1,078,826   Germany _____ Mar. 31, 1960